United States Patent

[11] 3,596,246

[72] Inventors Yukio Nakagome
Tokyo-to;
Kitsutaro Amano, Yokohama-shi; Yasuo Fukata, Tokyo-to, all of, Japan

[21] Appl. No. 678,260
[22] Filed Oct. 26, 1967
[45] Patented July 27, 1971
[73] Assignee Kokusai Denshin Denwa Kabushiki Kaisha Toky-to, Japan
[32] Priority Oct. 29, 1966, Oct. 29, 1966, Oct. 29, 1966, Oct. 29, 1966
[33] Japan
[31] 41/71166, 41/71167, 41/71168 and 41/71169

[54] TIME-DIVISIONAL DATA SWITCHING SYSTEM
7 Claims, 1 Drawing Fig.

[52] U.S. Cl. ... 340/147, 179/15
[51] Int. Cl. ... H04q 9/00
[50] Field of Search ... 340/147, 147 SX, 147 C, 147 P; 179/89, 2, 15 AT

[56] References Cited

UNITED STATES PATENTS

| | | | |
|---|---|---|---|
| Re.26,331 | 1/1968 | Brothman et al. | 179/2 |
| 3,336,445 | 8/1967 | Nakagawa | 179/89 |
| 3,230,509 | 1/1966 | Spencer | 340/147 X |
| 3,366,743 | 1/1968 | Darre et al. | 179/15 AT |
| 3,400,375 | 9/1968 | Bowling et al. | 340/147 X |
| 3,400,378 | 9/1968 | Brown | 340/147 X |
| 3,401,235 | 9/1968 | Corbin et al. | 179/15 AT |
| 3,469,021 | 9/1969 | Dahlblom et al. | 340/147 X |
| 3,476,878 | 11/1969 | Oshima et al. | 340/147 X |

*Primary Examiner*—Donald J. Yusko
*Attorneys*—Robert E. Burns and Emmanuel J. Lobato

ABSTRACT: Disclosed herein is a system for time-divisional switching of messages of data channels by use of time-divisional connection circuitry under control of a data processor, in which exchange-connection signals, used to establish respective connected combinations between calling channels and called channels precede the messages to be communicated. Character control circuitry is provided between the data processor and time-divisional connection circuitry so that the time-divisional switching of messages is performed for each character of parallel signal configuration messages without the insertion of such messages into the data processor.

TIME-DIVISIONAL DATA SWITCHING SYSTEM

This invention relates to a time-divisional data switching system and more particularly to a system for time-divisionally switching messages of data channels in which an "Exchange-Connection Signal," such as a calling signal, a call-confirmation signal and a selection signal etc., precede the messages to be communicated.

Conventional switching systems have provided direct-switching systems and store-and-forward switching systems. The former system is provided with a time-divisional connection circuit for time-divisionally interconnecting between input channels and output channels, and a connection-control circuit (central processor) for controlling the time-divisional interconnecting operation of the time-divisional connection circuit. In this arrangement, the connection-control circuit (central processor) takes part in the interconnecting operation of the time-divisional connection circuit, when the input and output channels are to be interconnected or to be cleared and it controls the switching-and-connecting operation between the input and output channels. In communicating messages through this system, data signals from respective input channels are transmitted directly or through a buffer memory of unit pulse (one bit) to corresponding output channels. As the result of the above-mentioned construction of the conventional direct-connection system, input and output channels are substantially connected in real time. Accordingly, the signal conditions and modulation rates of the input and output channels are to be the same as to each other respectively, and modulation rates of all the handled channels are to be the same as to one another. Moreover, since the number of channels switched by one set of the conventional direct-switching system is several hundreds at most, it is necessary to employ several sets of such systems if a greater number of channels are to be handled.

On the contrary, the latter (the store-and-forward switching system) is provided with a mass memory in which data signals from respective input channels are temporarily stored and sent out thereafter to desired output channels respectively. Accordingly, input and output channels having different modulation rates from each other can be handled by this system so as to compensate said disadvantages of the conventional direct-switching system. This characteristic is suitable to the switching of telegraph circuits for fixed service but not always suitable to the switching of teletypewriter exchange service channels in which response without delay is required.

An object of this invention is to provide a time divisional data switching system capable of overcoming the disadvantages of the conventional switching systems and having both the advantages of the direct-switching system and the store-and-forward switching system.

Another object of this invention is to provide a time-divisional data switching system in which the time-divisional connection circuit and the connection-control circuit may be operated in independent time-sequence from each other.

Another object of this invention is to provide a time-divisional data switching system capable of handling messages of a plurality of channels having different signal conditions to one another.

In accordance with the invention a system is provided for using a data processor for time-divisional switching of messages of data channels in which exchange-connection signals, which as used to establish respective connected combinations between calling channels, and called channels precede the messages to be communicated. The system of this invention comprises the data processor, at least one signal converter, and character control means for controlling the communication of the individual characters which make up a message. The signal converter has first means for time-divisionally converting the serial-character signals from each input channel to parallel-character signals; a second means for converting time-divisionally the parallel-character signals to serial-character signals for coupling to the output channels; and third means for detecting the exchange-connection signals and other clearing signals time-divisionally for each channel and for sending out the exchange-connection signals and other clearing signals time-divisionally, for each channel to the output channels. The character control means has means for transferring signals between the signal converter and the data processor, time-divisionally for each channel; and, means for transferring message, time-divisionally for each channel, from the first means to the second means for each character, in accordance with the respective combinations of calling channels and called channels established under control of the data processor.

The principle of the present invention will be better understood from the following more detailed discussion taken in conjunction with the accompanying drawings, in which the same or equivalent parts are designated by the same reference numerals, characters and symbols as to one another; and in which.

Figure 1A:
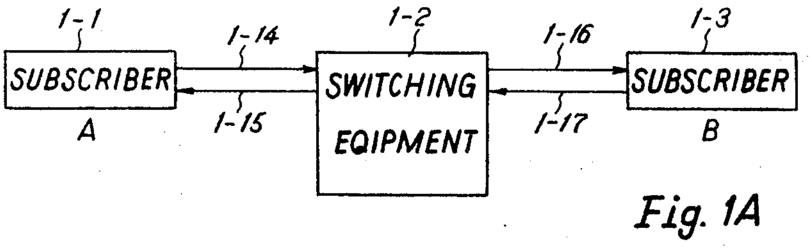
FIG. 1A is a block diagram for describing a data communication system including switching equipment to which the invention is to be applied.
Figure 1B:
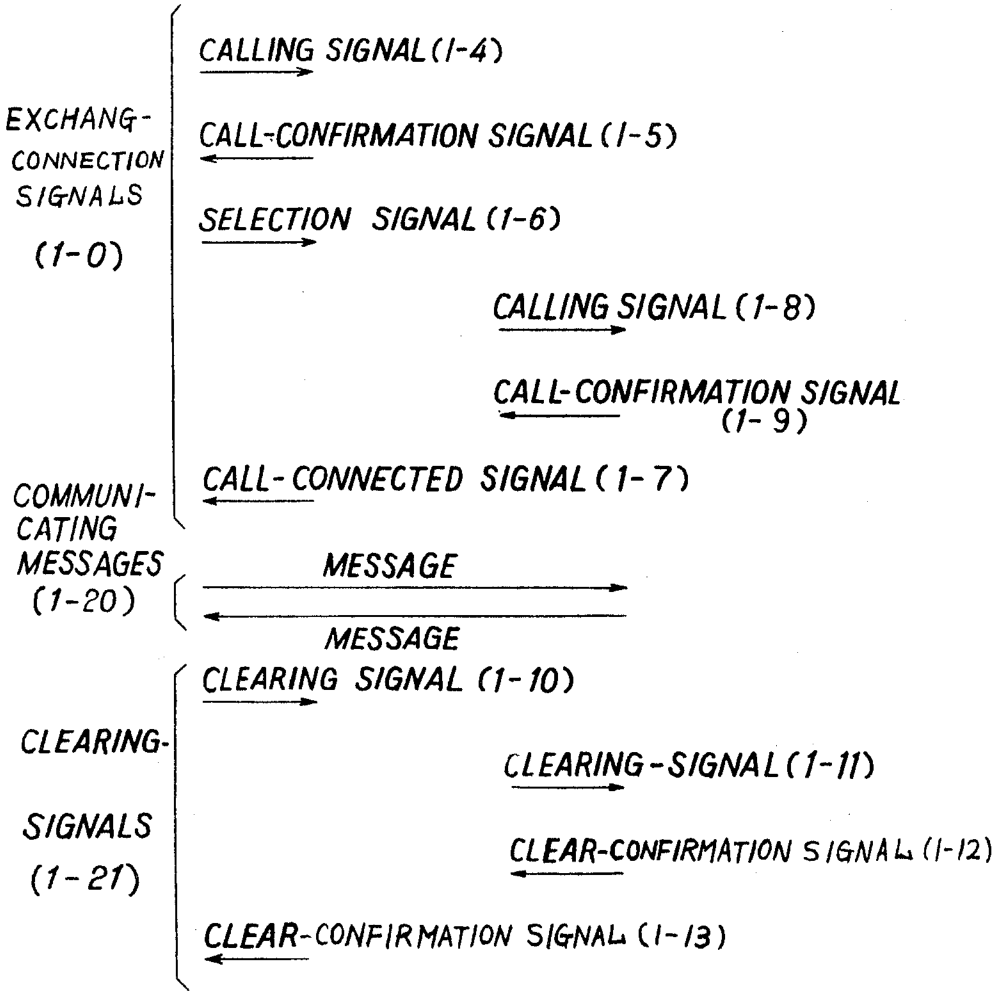
FIG. 1B is a diagram for describing the signal condition of a data switching system to which the invention is to be applied.

To afford a better understanding of the invention, the signal condition of the switching system in a teletypewriter exchange system to which the invention is applied will first be described with reference to FIGS. 1 and 2. In FIG. 1A, a subscriber 1–1 is assumed as a calling subscriber A, and a subscriber 1–3 is assumed as a called subscriber B. The calling subscriber 1–1 is connected through a forward signaling path 1–14 and a backward signaling path 1–15 to the input side of a switching equipment 1–2, and the output side of the switching equipment 1–2 is connected through a forward signaling path 1–16 and a backward signaling path 1–17 to the called subscriber. If the calling subscriber A starts a call, the subscriber 1–1 sends out a calling signal 1–4 to the signaling path 1–14 and the switching equipment 1–2 sends back a call-confirmation signal 1–5 to the calling subscriber 1–1 through the signaling path 1–15 in response to the calling signal 1–4. When the call-confirmation signal 1–5 is received by the calling subscriber 1–1, this subscriber 1–1 sends out a selection signal 1–6 corresponding to the called subscriber 1–3 to the switching equipment 1–2 through the signaling path 1–14; and the switching equipment 1–2 receives and interprets the transmitted selection signal 1–6 and sends out a calling signal 1–8 through the signaling path 1–16 to the called subscriber 1–3 selected in accordance with the result of this interpretation on the selection signal 1–6. When the calling signal 1–8 is received by the called subscriber 1–3, this subscriber 1–3 sends back a call-confirmation signal 1–9 through the signaling path 1–17 to the switching equipment 1–2. When the call-confirmation signal 1–9 is received by the switching equipment 1–2, this switching equipment 1-2 sends out a call-connected signal 1-7 through the signaling path 1-15 to the calling subscriber 1-1. The above-mentioned signals 1-4, 1-5, 1-6, 1-8, 1-9 and 1-7 are named generically as "exchange-connection signal 1-0." This exchange-connection signal 1-0 comprises, as shown in FIG. 1B, a group of signals transmitted between the calling subscriber 1-1 and the switching equipment 1-2 and a group of signals transmitted between the switching equipment 1-2 and the called subscriber 1-3.

When the call connection between the calling subscriber 1-1 and the called subscriber 1-3 is completed through the switching equipment 1-2, communicating messages 1-20 are transmitted and received between the subscribers 1-1 and 1-3.

Upon completion of the communicating messages 1-20, a clearing signal 1-10 is sent out from the calling subscriber 1-1 through the signaling path 1-14 to the switching equipment 1-2, which receives this clearing signal 1-10 and sends out a clearing signal 1-11 through the signaling path 1-16 to the called subscriber 1-3. When the clearing signal 1-11 is received by the called subscriber 1-3, this subscriber 1-3 sends back a clear-confirmation signal 1-12 through the signaling path 1-17 to the switching equipment 1-2, which receives the clear-confirmation signal 1-12 and sends out a clear-confirmation signal 1-13 through the signalling path 1-15 to the calling subscriber 1-1. According to the above-mentioned operations, connected links (1-14, 1-15) and (1-16, 1-17) are all cleared and become free-line conditions.

In the above-mentioned signals, the selection signal 1-6 and the communicating messages 1-20 are both telegraph signals the selection signal, but 1-6 may comprise dial pulses. The exchange-connection signal 1-0, except for the selection signal 1-6, and the clearing signals 1-21 (i.e.; 1-10, 1-11, 1-12 and 1-13) may comprise any type of signal configurations in which each of the signals is a binary signal having a predetermined pulse duration and a predetermined pulse spacing, such as recommended by C.C.I.T.T.

In the above description, the called side is assumed as a subscriber. However, a transmission line is usually composed of a number of links including a plurality of transit centers, such as the switching equipment 1-2. In this case, a group of signals 1-8 and 1-9 includes of course at least one selection signal, other calling signal or signals and call-confirmation signal or signals to select the succeeding links.

It is assumed that the switching system of this invention handles the data channels controlled by the above-mentioned signal condition in which the exchange-connection signals 1-0 are transmitted between the calling side and the called side before communicating messages therebetween.

Figure 2:
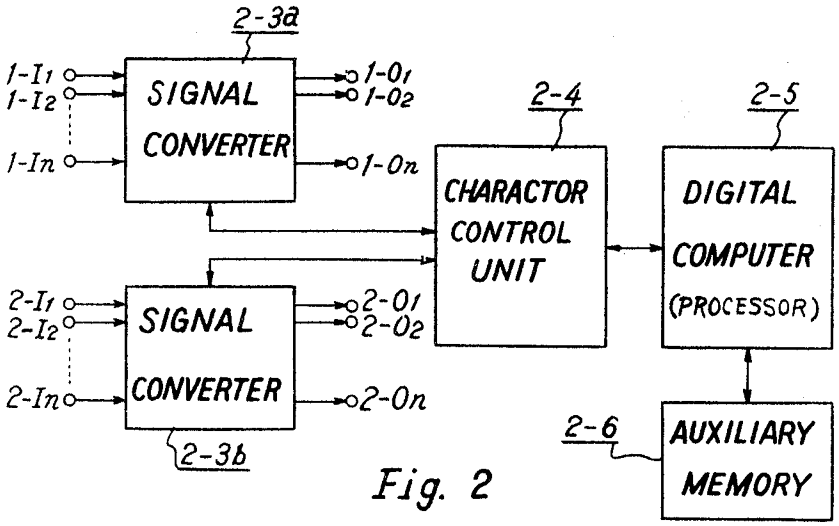
FIG. 2 is a block diagram for illustrating the constructive principle of the system of this invention.

With reference to FIG. 2, the principle and operation of the switching system of this invention will now be described. The respective channels are connected to this switching system through input terminals $1\text{-}I_1$, $1\text{-}I_2$, ... $1\text{-}I_n$, $2\text{-}I_1$, $2\text{-}I_2$, ... $2\text{-}I_n$ ... and output terminals $1\text{-}0_1$, $1\text{-}0_2$, ... $1\text{-}0_n$, $2\text{-}0_1$, $2\text{-}0_2$, ... $2\text{-}0_n$ ... . In this case, each pair of input and output terminals ($1\text{-}I_1$, $1\text{-}0_1$), ($1\text{-}I_2$, $1\text{-}0_2$), ... ($1\text{-}I_n$, $1\text{-}0_n$), ($2\text{-}I_1$, $2\text{-}0_1$), ($2\text{-}I_2$, $2\text{-}0_2$), ... ($2\text{-}I_n$, $2\text{-}0_n$) composes a channel which is connected to each subscriber trunk line and operates at a predetermined modulation rate (e.g.; 50 Bauds, 100 Bauds, 200 Bauds etc.).

Each of signal converters 2-3a and 2-3b detects the control signals 1-4, 1-6, 1-9, 1-10 and 1-12 transmitted from the input terminals and sends out the control signals 1-5, 1-8, 1-7, 1-11 and 1-13. Moreover, it receives serial-character signals (1-6 and 1-20), such as dial pulses or international alphabet signals (equal length code) and then converts them to parallel-character signals; and it converts, for each channel, parallel-character signals to serial-character signals 1-20 to send out to respective output channels. The above-mentioned operations are carried out time-divisionally for each channels. If the number of channels increases, messages from these increased channels can be handled by increasing only the number of the signal converters 2-3a, 2-3b, ... .

A character control unit 2-4 is provided with a memory for storing respective combinations of calling channels and called channels, and it transfers the parallel-character signals from one to the other of said established pair of calling and called channels. This character control unit 2-4 transfers the parallel-character signals between the signal converter (2-3a or 2-3b) and a processor 2-5 mentioned below. The above-mentioned operations of this unit are carried out time-divisionally for each channel.

The processor 2-5 is an electronic digital computer, by way of example, which is provided with a table for storing the conditions of handled channels. This processor 2-5 receives and interprets the selection signal 1-6 passed through the signal converter (2-3a or 2-3b) and the character control unit 2-4, and it records the called-channel number in the memory of the character control unit 2-4 if it is confirmed that the called channel corresponding to the selected signal 1-6 actually exists and is in the "free condition (not occupied)" on reference to the table.

An auxiliary memory 2-6 is an external memory, such as a magnetic tape recorder, to be employed as an auxiliary device of the processor 2-5.

An example of the operations of this switching system in which a calling subscriber is connected to a called subscriber will be now described. In this case, it is assumed that the calling subscriber A is the subscriber 1-1 shown in FIG. 1A and connected to the input and output terminals $1\text{-}I_1$ and $1\text{-}0_1$ shown in FIG. 2 and that the called subscriber B is the subscriber 1-3 shown in FIG. 1A and connected to the input and output terminals $2\text{-}1_n$ and $2\text{-}0_n$.

If the subscriber A sends out a calling signal 1-4, this calling signal 1-4 reaches the terminal $1\text{-}I_1$ through the forward signaling path 1-14. When the signal converter 2-3a detects the calling signal 1-4, it sends out the call-confirmation signal 1-5 from the output terminal $1\text{-}0_1$ to the backward signaling path 1-15. The subscriber A receives the call-confirmation signal 1-5 and thereafter sends out the selection signal 1-6 through the forward signaling path 1-14 to the input terminal $1\text{-}I_1$. The signal converter 2-3a converts the received selection signal 1-6 to a parallel-character signal, which is transferred through the character control unit 2-4 to the processor 2-5. Since the processor 2-5 is provided with the table for storing the conditions of handled channels as mentioned before, if it is confirmed that the channel ($2\text{-}I_n$, $2\text{-}0_n$) of the called subscriber B is in the "clear condition" on reference to the condition of the table, the processor 2-5 changes the "-clear condition" of the table to the "busy condition" and sends out, through the character control unit 2-4 to the signal converter 2-3b, a control signal causing the signal converter 2-3b to send out the calling signal 1-8 from the output terminal $2\text{-}0_n$. This calling signal 1-8 sent out reaches the subscriber B through the forward signaling path 1-16, and the call-confirmation signal 1-9 is sent back from the called subscriber B through the backward signaling path 1-17 to the input terminal $2\text{-}I_n$. The signal converter 2-3b detects this call-confirmation signal 1-9 and transmits an indication of this detection as a control signal to the processor 2-5 through the character control unit 2-4. When the processor 2-5 detects this control signal, it sends out, through the character control unit 2-4 to the signal converter 2-3b, a control signal causing the signal converter 2-3b to send out the call-connected signal 1-7 to the calling subscriber A. At the same time, the processor 2-5 causes the character control unit 2-4 to record an established combination of the calling channel ($1\text{-}I_1$, $1\text{-}0_1$) and the called channel ($1\text{-}I_n$, $1\text{-}0_n$). Thereafter, communicating messages 1-20 are transferred between the subscribers A and B in accordance with the established combination for each character through a path (2-3a→2-4→2-3b) or a path (2-3b→2-4→2-3a). If the communication of messages is completed, the clearing signal 1-10 is sent out from the calling subscriber A. Since the clearing signal 1-10 is characterized by a sequence signal of space polarity lasting for a plurality of character-durations, this clearing signal 1-10 can be detected by a counter provided at the character control unit 2–4 or the signal converter 2–3. When the clearing signal 1–10 is detected at the character control unit 2–4, this unit 2–4 transmits an indication of this detection to the processor 2–5. In this case, the processor 2–5 transmits a control signal to the signal converter 2–3a so as to cause it to send out a clearing signal 1–11 through the forward signaling path 1–16 to the called subscriber B. When the clearing signal (1–11) is received at the called subscriber B, this subscriber B sends out the clear-confirmation signal 1–12 to the backward signaling path 1–17. This clear-confirmation signal 1–12 is detected by the character control unit 2–4 similarly as the clearing signal 1–10, and the clear-confirmation signal 1–13 is sent out to the calling subscriber A through the backward signaling path 1–15. As a modification of the above-mentioned clearing operation, the clear-confirmation signal 1–13 can be sent out at the same time as the clearing signal 1–11 in response to the control signal from the processor 2–5.

Figure 3:
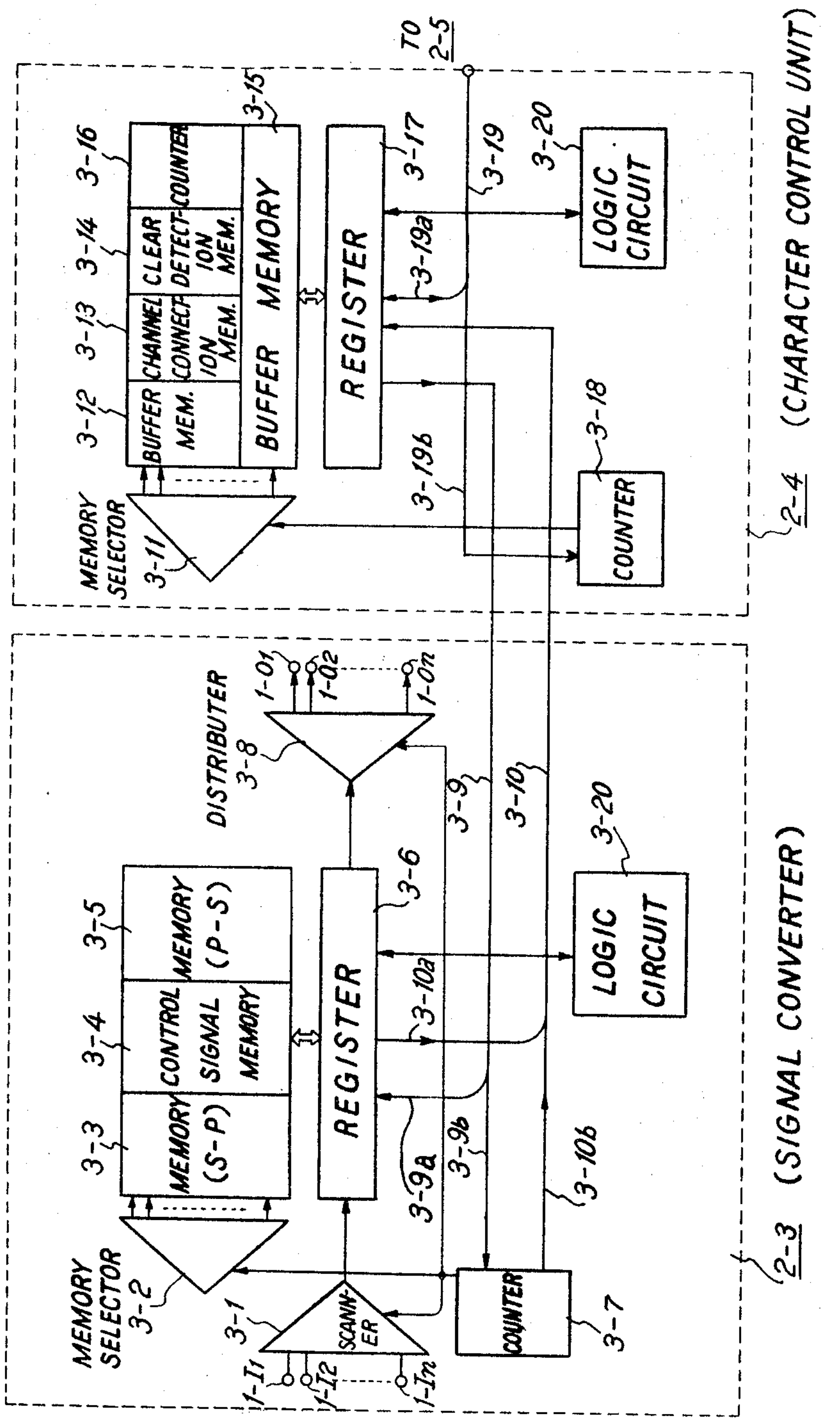
FIG. 3 is a block diagram for illustrating examples of a signal converter and a character control unit to be employed in the system of this invention.

With reference to FIG. 3, examples of the signal converter 2–3 and the character control unit 2–4 will now be described.

The signal converter 2–3 comprises a scanner 3–1, a memory selector 3–2, memories 3–3, 3–4 and 3–5, a register 3–6, a counter 3–7, a distributor 3–8, a logic circuit 3–20 and other connection lines. The scanner 3–1, the memory selector 3–2 and the distributor 3–8 are scanned by the output timing signals of the counter 3–7 which is a ring counter having a scale equal to the number of handling channels. In other words, two circuits 3–1 and 3–8 select a pair of channels of the same call at a time-divisional time slot as to each other, and the memory selector 3–2 reads out, similarly, the memory contents of the same call from the memories 3–3, 3–4 and 3–5 to the register 3–6. The memory 3–3 is employed for converting serial-character signals, time-divisionally, for each channel to parallel-character signals. The memory 3–4 is a control signal memory for detecting and controlling the exchange-connection signals 1–0 and the clearing signals 1–20. The memory 3–5 is employed for converting parallel-character signals to serial-character signals, time-divisionally, for each channel.

If the counter 3–7 selects an input channel $1\text{–}I_1$ of the scanner 3–1, the signal of this channel $1\text{–}I_1$ is applied to the register 3–6 as an output signal (I) of the scanner 3–1. On the other hand, stored characters (II) corresponding to this channel $1\text{–}I_1$ are read out from the memories 3–3, 3–4 and 3–5 to the register 3–6 by the control of the memory selector 3–2 timed with the output timing signals of the counter 3–7. The signal (I) and the characters (II) are modified in the register 3–6 under control of the logic circuit 3–20. New characters (III) produced by repeating the above modification are again stored in the memories 3–3, 3–4 and 3–5. At the next time slot, the counting state of the counter 3–7 increases by "1" and the next channel $1\text{–}I_2$ is selected so as to carry out the operation similar to that mentioned above. The above operation is carried out at each time slot, so that signals from the input channels are time-divisionally handled in this signal converter 2–3 for each time slot. Details of these operations will be described hereafter.

The character control unit 2–4 comprises, by way of example, a memory selector 3–11, memories 3–12, 3–13 and 3–14, a counter 3–16, a buffer memory 3–15, a register 3–17, a counter 3–18, a logic circuit 3–20 and other connection lines. The counter 3–18 is a ring counter having a scale equal to the number of handled channels and scans the memory selector 3–11. The memory 3–13 is a channel connection memory for storing the established respective combinations of calling channels and called channels. The memory 3–12 is a buffer memory for transferring signals, under control of the channel connection memory 3–13, between calling channels and called channels. The memory 3–14 is a clear detection memory to be employed for clearing the established combinations of calling channels and called channels. The counter 3–16 is employed for counting the number of characters which are passed through the buffer memory 3–12. The counting state of the counter 3–16 is read out from the processor 2–5 and employed as data, such as charging information. The memory 3–15 is a buffer memory for transferring parallel-character signals between the signal selector 2–3 and the processor 2–5.

In this character control unit 2–4, if the output of the counter 3–18 selects a memory address through the memory selector 3–11, memory contents (4) of the memories 3–12, 3–13, 3–14, 3–15 and the counter 3–16 are read out to the register 3–17. These memory contents (4) are applied to the logic circuit 3–20 and modified in consideration of the content (5) of the register 3–6 (i.e.; the contents of memories 3–3, 3–4 and 3–5) and the information (6) applied from the processor 2–5 through a line 3–19. The modified memory contents (4a) are again stored in the memories 3–12, 3–13, 3–14 and 3–15 and the counter 3–16.

Control lines 3–9 and 3–10 are employed for transferring signals between the signal converter 2–3 and the character control unit 2–4. A control line 3–9b is a path for transferring address signals and interrupting instructions which are employed to interrupt the scanning operation of the counter 3–7 and to control the memory selector 3–2. The above-interruption of the scanning operation of the counter 3–7 is carried out at an appropriate time slot so as to disturb the scanning operation of the scanner 3–1. If, for example, it is assumed that the number of input channels is four and that two interruptions are allowable in a scanning period, the counter 3–7 is a scale-of-6 ring counter. In this case, four counting states are assigned to the four channels and remaining two counting states are assigned to the interruptions. This operation will be described hereafter in detail. A control line 3–9a is employed for transferring signals from the register 3–17 to the register 3–6. A line 3–10b is employed for read out the channel number of the calling channel from the character control unit 2–4, and a line 3–10a is employed for transferring parallel-character signals to the register 3–17. The counting state of the counter 3–18 is interrupted by a control signal applied, through a line 3–19b, from the processor 2–5. However, this interruption is also carried out so as to disturb the scanning operation of the memory selector 3–11.

Figure 4A:
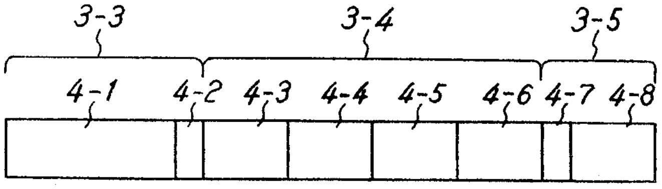
FIG. 4A is a diagram for describing the construction of a memory used in the signal converter.

With reference to FIGS. 3 and 4A, bit-arrangements of memories 3–3, 3–4 and 3–5 and the register 3–6 will be described in detail. A memory zone corresponding to the memory 3–3 comprises a zone 4–1 and a zone 4–2. The zone 4–1 is a temporary storage of bits necessary for converting serial-character signals into parallel-character signals. The zone 4–2 is employed for detecting the kind of input serial-character signals, whether they are dial pulses or alphabetic telegraph signals. Binary information stored as a parallel-character signal in the zone 4–1 is transferred, through the line 3–10a and the register 3–17, to the buffer memory 3–12.

A memory zone corresponding to the memory 3–5 comprises a zone 4–8 and a zone 4–7. The zone 4–8 is a temporary storage of bits necessary for converting parallel-character signals into serial-character signals. The zone 4–7 is employed for detecting the kind of output serial signals similarly as the zone 4–2. A parallel-character signal is transferred from the buffer memory 3–12 through the line 3–9a to the zone 4–8, and this parallel-character signal is converted to a serial-character signal and sent out through the distributor 3–8.

A memory zone corresponding to the control signal memory 3–4 comprises zones 4–3, 4–4, 4–5 and 4–6. The zone 4–3 is composed of bits employed for indicating the types of the exchange-connection signals (1–0), and the contents of these bits are fixed for each of the channels, so that they are not modified during communications. The zone 4–4 is composed of state-bits indicating successive conditions of the detection processes for the exchange-connection signals 1–0. The contents of the state bits (4–4) are applied to the logic circuit 3–20, so that contents of zones 4–4, 4–2 and 4–7, and the below mentioned zones 4–5 and 4–6, are modified in accordance with the logic operation of the logic circuit 3–20. The zone 4–5 is a counting memory for measuring the pulse duration or pulse spacing of each signal in the exchange-connection signals 1–0 and the clearing signals 1–20 under the control of the logic circuit 3–20. Namely, the counting state of the counting memory (4–5) is set at a state at an initial time of a received or sent pulse and thereafter reduced by "1" for each scanning of the channel until it reaches zero. According to this operation, the pulse duration is digitally measured. Measurement of the pulse spacing can be carried out similarly. The zone 4–6 is a buffer memory employed for transferring, under the control of the logic circuit 3–20, control signals between this signal converter 2–3 and the processor 2–5.

Figure 4B:
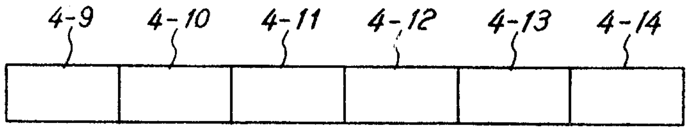
FIG. 4B is a diagram for describing the construction of a memory used in the character control unit.

With reference to FIG. 4B, bit-arrangements of the memories 3–12, 3–13, 3–14 and 3–15, the counter 3–16 and the register 3–17 are described. Zones 4–9 and 4–10 are employed for storing respectively the numbers corresponding to the calling channel and the called channel of the established combination. The contents of the zones 4–9 and 4–10 are set by the processor 2–5 through the line 3–19*a* and employed as an address signal for transferring signals between these zones and the memories 3–3, 3–4 and 3–5, in the case of an interruption, (mentioned below) through the line 3–9*b*. Zones 4–11 and 4–12 are character-buffers employed for transferring characters between one and the other of the established combination of the calling channel and the called channel. Operations as to these zones are carried out as follows:

i. Contents of memories 3–3, 3–4 and 3–5 are designated in accordance with the contents of the zone 4–9, and the parallel characters stored in the memory 3–3 are transferred to the zone 4–11.
ii. Contents of memories 3–3, 3–4 and 3–5 are designated in accordance with the contents of the zone 4–10, and the parallel characters stored in the memory 3–3 are transferred to the zone 4–12.
iii. The parallel characters stored in the zone 4–12 are transferred to the zone 4–8 in addresses of memories 3–3, 3–4 and 3–5 designated in accordance with the contents of the zone 4–9.
iv. The parallel characters stored in the zone 4–11 are transfered to the zone 4–8 in addresses of memories 3–3, 3–4 and 3–5 designated in accordance with the contents of the zone 4–10.

According to above-operation, the transfer of characters between channels of the established combination are carried out. A zone 4–13 is employed for recording binary information obtained in counting the number of characters passed through the zones 4–11 and 4–12. The contents of the zone 4–13 can be read out from the processor 2–5. A zone 4–14 is composed of bits employed for detecting the clearing signals 1–20 by counting the number of all-space periods in parallel-character signals transferred into the zone 4–11. In this case, if the number of all-space periods exceeds a predetermined number, the transferred parallel-character signal is detected as one of the clearing signals 1–20. This detected result is transferred to the processor 2–5.

Figure 5:
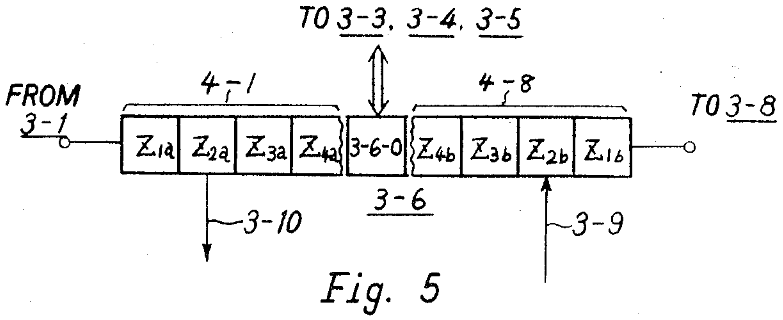
FIG. 5 is a diagram for describing an example of a register to be used in the signal converter.

With reference to FIG. 5, a modification of the register 3–6 will be described. For simple illustration, only a part of the bit-arrangements is illustrated in FIG. 5. Zones $Z_{1a}$, $Z_{2a}$, $Z_{3a}$ and $Z_{4a}$ correspond to the zone 4–1 of FIG. 4A, and zones $Z_{1b}$, $Z_{2b}$, $Z_{3b}$ and $Z_{4b}$ correspond to the zone 4–8 of FIG. 4A. A zone 3–6–0 is employed for indicating the number of code-elements of input characters for each channel. The zone $Z_{1a}$ is a shift register for shifting, by one bit, bits of the input character applied time-divisionally from the scanner 3–1. The zone $Z_{2a}$ is a register employed for receiving the shifted bits from the zone $Z_{1a}$ as a parallel character signal. The zone $Z_{3a}$ is a counting register employed for generating sampling pulses to sample at each center of code-elements of the input serial-character signal. The zone $Z_{4a}$ is a counting register for counting the number of code-elements of the input serial character signal. The initial state of the counting register ($Z_{4a}$) is set in accordance with the number of code-elements stored in the forementioned zone 3–6–0, and the counting state of this counting register $Z_{4a}$ is reduced by "1" for each receipt of code-elements of the input serial-character signal. Zones $Z_{1b}$, $Z_{2b}$, $Z_{3b}$ and $Z_{4b}$ correspond respectively to the zones $Z_{1a}$, $Z_{2a}$, $Z_{3a}$ and $Z_{4a}$ but are employed for converting parallel-character signals into serial-character signals for each character. A parallel-character signal transferred into the zone $Z_{2b}$ through the line 3–9 is transferred to the zone $Z_{1b}$ and sent out as a serial signal by successive shifting through the distributor 3–8.

The above-operations are carried out time-divisionally for each channel. As the result of the provision of the zone 3–6–0, the system of this invention employing this modified register 3–6 is able to handle signals of channels having different numbers of code-elements from each other.

Figure 6:
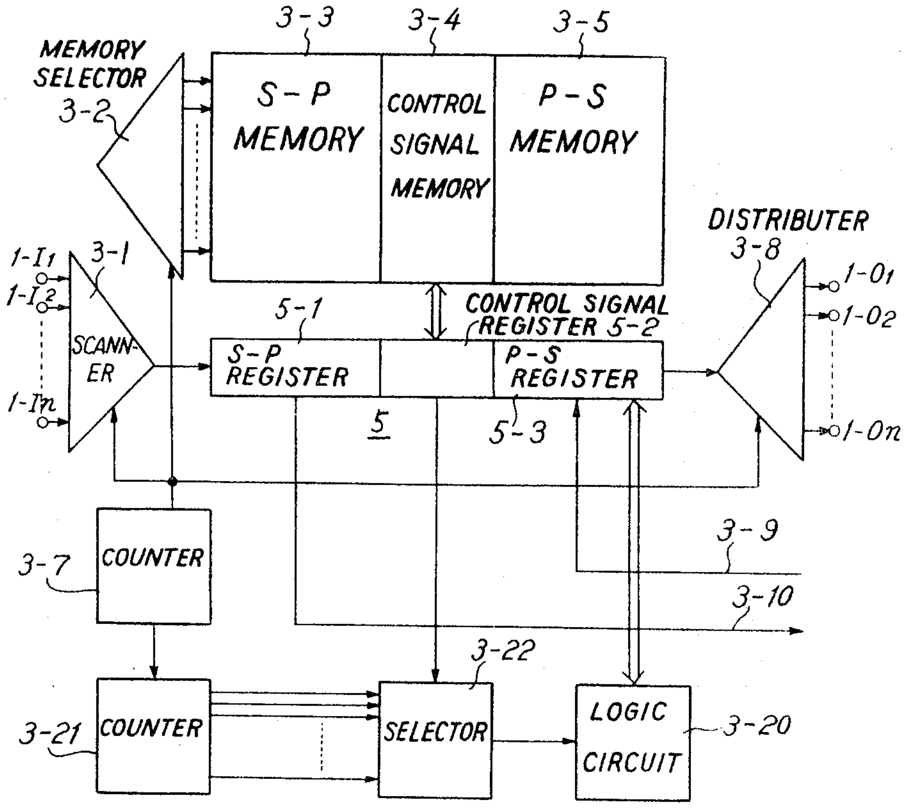
FIG. 6 is a block diagram for illustrating another example of the signal converter.
Figure 7:
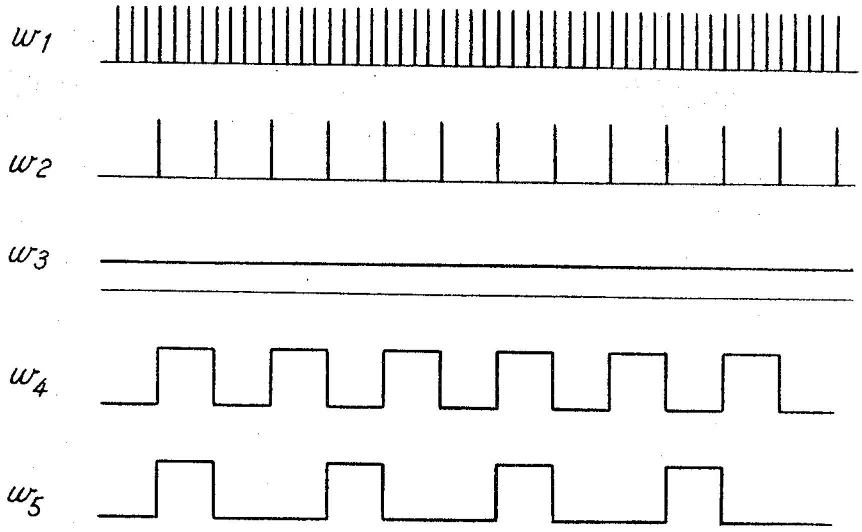
FIG. 7 shows time-charts for describing the operation of the signal converter shown in FIG. 6.

With reference to FIGS. 6 and 7, construction and operation of another example of the signal converter 2–3 will be described. Most of the parts of this signal converter 2–3 are similar to those of the signal converter shown in FIG. 3, so that only the parts which differ from those of FIG. 3 will be described. A register 5 of this example, corresponding to the register 3–6 of FIG. 3, is composed of a S-P register 5–1, a control signal register 5–2 and a P-S register 5–3. The S-P register 5–1 is employed for converting input serial-character signals to parallel-character signals, and its contents correspond to the contents of the P-S memory 3–3. The control signal register 5–2 is employed for temporarily storing the contents of the control signal memory 3–4. The P-S register 5–3 is employed for converting parallel-character signals, transferred through the line 3–9, into serial-character signals and its contents correspond to the contents of the S-P memory 3–5. A counter 3–21 counts the carry output of the counter 3–7 and generates outputs (e.g.; $w_3$, $w_4$, $w_5$ in FIG. 7). In FIG. 7, pulses $w_1$ are the clock pulse train of the counter 3–7, and pulses $w_2$ are the carry pulses of the counter 3–7 in a case where the counter 3–7 is a scale-of-4 counter by way of simple example. As mentioned above, the counter 3–21 generates outputs obtained by use of the carry pulses $w_2$. In this case, however, an output $w_3$ is a special output having the mark polarity (output "1") in all time bases. A selector 3–22 selects one of the outputs of the counter 3–21 under control of the contents of the control signal register 5–2 which stores binary information representative of the modulation rate (telegraph speed) of each channel. In this arrangement, the logic operation of the logic circuit 3–20 is carried out only when the output of the selector 3–22 assumes "1." In other cases, the contents of the register 5 are again transferred to the memories 3–3, 3–4 and 3–5 without modification by the logic circuit 3–20. If it is assumed that the counter 3–7 is synchronized with a modulation rate 150 Bauds, the outputs $w_3$, $w_4$ and $w_5$ correspond respectively to modulation rates 150 Bauds, 75 Bauds and 50 Bauds. As understood from the above example, the frequency of the clock pulses is equal to the least common multiple (L.C.M.) of modulation rate (Bauds) of signals of all the handled channels. As the result of the above construction and operation, data channels operated in different modulation rates from one another can be handled in this signal converter 2–3.

Figure 8:
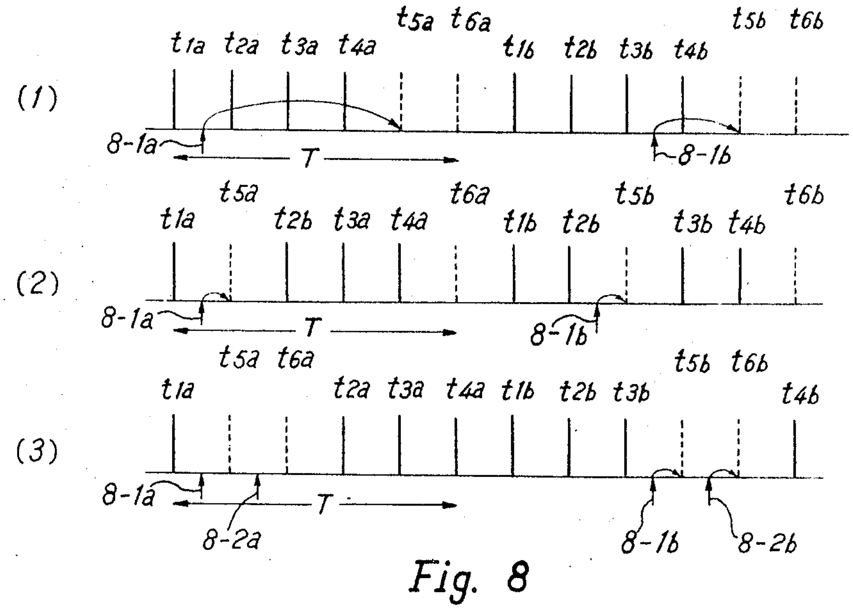
FIG. 8 shows time-charts for describing the operation of a circuit shown in FIG. 9.
Figure 9:
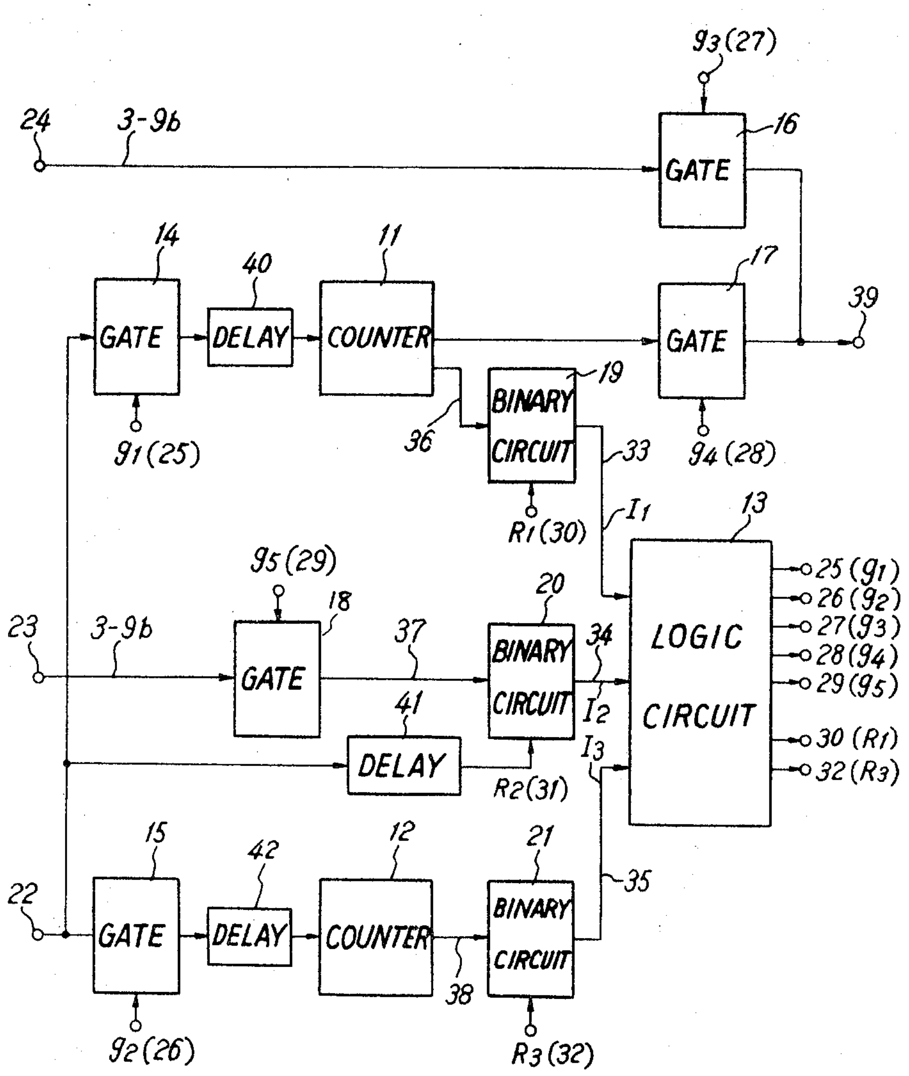
FIG. 9 is a block diagram for illustrating an example of an interruption system to be employed in the system of this invention.

With reference to FIGS. 8 and 9, an example of the forementioned interruption system for interrupting a predetermined time-divisional access operation to a memory will now be described. The interrupting operation in conventional systems of the type is usually carried out as shown in a time chart (1) of FIG. 8, in which times $t_{1a}$, $t_{2a}$, $t_{3a}$, $t_{4a}$ ... $t_{1b}$, $t_{2b}$, $t_{3b}$ and $t_{4b}$ are normal access time slots to a memory and times $t_{5a}$, $t_{6a}$, ... $t_{5b}$ and $t_{6b}$ show interrupting time slots, and in which a period T is a period of the scanning. Accordingly, if an interrupting instruction occurs as shown by an arrow 8–1*a* or 8–1*b*, the actual interruption cannot be carried out until the nearest interrupting time slot (i.e.; $t_{5a}$ or $t_{5b}$). According to the feature of this invention, the above-interrupting operation can be carried out at the nearest access time slot just succeeding to an occurrence time of an interrupting instruction. Namely, if the interrupting instruction 8–1*a* or 8–1*b* occurs after the time slot $t_{1a}$ or $t_{2b}$ as shown in a time-chart (2) of FIG. 8, the first interrupting time slot can be changed to the nearest time slot $t_{5a}$ or $t_{3b}$ which corresponds to the time slot $t_{2n}$ or $t_{3b}$ in the time-chart (1). Moreover, even if two interrupting instructions occur in a scanning period, these two instructions (8–1*a*, 8–2*a*) or (8–1*b*, 8–2*b*) can be similarly handled as shown in a time-chart (3) of FIG. 8. However, the number of allowable interrupting operations in a scanning period T is predetermined as the conventional system. Accordingly, if the number of interrupting instructions in a scanning period T exceeds the number of allowable interrupting operations, only the overflowed interrupting instructions are rejected in this overflowed period.

An example of this system is illustrated in FIG. 9. In this arrangement, the counting states of a counter 11 indicates memory addresses corresponding respective to handled channels. A counter 12 counts the number of allowable interrupting time slots in a scanning period of the counter 11, and it is a scale-of-2 counter if the number of allowable interrupting time slots is two as mentioned above. Each of the interrupting instructions is applied from a terminal 23 as a pulse signal. Address signals each indicating an address of a memory to which the interrupting operation is carried out are applied from a terminal 24. Timing pulses for determining the access timing of a memory are applied from a terminal 22. AND gates 14, 15, 16, 17 and 18 are respectively gated by gate signals $g_1$, $g_2$, $g_3$, $g_4$ and $g_5$ which are applied from respective output terminals 25, 26, 27, 28 and 29 of a logic circuit 13. A binary circuit 19 is set by a carry pulse of the counter 11 and reset by an output $R_1$ applied from an output terminal 30 of the logic circuit 13. A binary circuit 20 is set by an output 37 of the gate 18 and reset by an output $R_2$(31) of a delay circuit 41. A binary circuit 21 is set by a carry pulse 38 of the counter 12 and reset by an output $R_3$ applied from an output terminal 32 of the logic circuit 13. The logic circuit 13 generates outputs in accordance with respective combinations of states of the binary circuits 19, 20 and 21 so that the gates 14 to 18 and the bistable circuits 19 and 21 are controlled. A Table 1 indicating outputs 25 to 32 of the logic circuit 13 in response to respective states "1" or "0" of its inputs 33($I_1$), 34($I_2$) and 35($I_3$) is as follows:

TABLE 1

| Case No. | Input conditions 33 ($I_1$) | 34 ($I_2$) | 35 ($I_3$) | Output conditions 25 ($g_1$) | 26 ($g_2$) | 27 ($g_3$) | 28 ($g_4$) | 29 ($g_5$) | 30 ($R_1$) | 32 ($R_3$) |
|---|---|---|---|---|---|---|---|---|---|---|
| 1 | 0 | 0 | 0 | 1 | | | 1 | 1 | | |
| 2 | 0 | 0 | 1 | 1 | | | 1 | | | |
| 3 | 0 | 1 | 0 | | 1 | 1 | | 1 | | |
| 4 | 0 | 1 | 1 | 1 | | | 1 | | | |
| 5 | 1 | 0 | 0 | | 1 | | | 1 | | |
| 6 | 1 | 0 | 1 | 1 | | | 1 | 1 | 1 | 1 |
| 7 | 1 | 1 | 0 | | 1 | 1 | | 1 | | |

Each of delay circuits 40 and 42 has a delay time slightly longer than the duration of each of the timing pulses, and the delay circuit 41 has a delay time slightly shorter than a spacing between adjacent timing pulses. Address signals are taken out of an output terminal 39 and supplied to a memory selector.

If this system is applied to the arrangement shown in FIG. 3, it is provided in the counter 3–7 or 3–18. In this case, the timing pulses applied to the terminal 22 are generated by a clock generator (not shown). The address signals applied to the terminal 24 and the interrupting instructions applied to the terminal 23 are transferred through the line 3–9*a* or 3–19*b*. The output terminal 39 is connected to the memory selector 3–2 or 3–11.

The operation of this system will be described below with reference to a simple example in which the number of access time slots in equal to four and the number of allowable interrupting time slots is equal to two in the scanning period T.

i. In a case where there is no interrupting instructions:

If it is assumed that the counters 11 and 12 and the binary circuits 19, 20 and 21 are started at their reset conditions "0," since the inputs $I_1$, $I_2$, $I_3$ of the logic circuit 13 are all zero (case No. 1 of the Table 1), the logic circuit 13 generates its output 25, 28 and 29 only. Accordingly, the gates 14 and 17 are opened so that the contents of the counter 11, being an address signal of an address "00," are sent out of the output terminal 39.

Since a timing pulse is then applied to the counter 11 through the terminal 22, the opened gate 14 and the delay circuit 40, the counting state of the counter 11 increases by "1." Accordingly, an address signal of an address "01" is sent out of the output terminal 39. Thereafter, address signals of addresses "10" and "11" are successively sent out from the output terminal 39 in response to the succeeding timing pulses.

When the counting state of the counter 11 is reset to the condition "00" in response to the next timing pulse, a carry pulse is generated from the counter 11 and sets the binary circuit 19. At this time, since the inputs of the logic circuit 13 assume the condition of case No. 5, the logic circuit 13 generates only its outputs 26 and 29. Accordingly, the gates 14 and 17 are closed and the gates 15 and 18 are opened. The next timing pulse passes through the opened gate 15 and the delay circuit 42 and is applied to the counter 12, so that the counting state of the counter 12 assumes a condition "1." In response to the further applied timing pulse, the counting state of the counter 12 is reset to the initial condition "0" and the counter 12 generates a carry pulse 38 at the same time. Since the binary circuit 21 is set in response to the carry pulse 38, the inputs of the logic circuit assumes a condition "101" being case No. 6. Accordingly, the logic circuit 13 generates its outputs 25, 28, 29, 30 and 32 so that the binary circuits 19 and 20 are reset to their initial conditions "0."

Thereafter, the above-mentioned operations are repeated. In said operations, since the output 29 is always generated so that the gate 18 is opened, the interruption mentioned below is allowable at any time slot.

ii. In a case where the interrupting instruction or instructions is/are applied:

a. If it is assumed that the counters 11 and 12 and the binary circuits 19, 20 and 21 are started at their reset conditions "0" similarly as the above case (*i*), since the input condition of the logic circuit 13 is case No. 1, the logic circuit 13 generates only its outputs 25, 28 and 29. Accordingly, an address signal "00" is sent out of the output terminal 39 similarly as the above case (*i*).

At this time, if an interruption instruction is applied from the terminal 23 as shown in the time chart (1) of FIG. 8, the pulse of this instruction is passed through a gate 18 opened by the output 29 and resets the binary circuit 20. Since the input condition of the logic circuit 13 becomes a condition "010" being case No. 3 of the Table 1, the logic circuit 13 generates only outputs 26, 27 and 29. Accordingly, the gates 14 and 17 are closed and the gates 15 and 15 are opened so that the address signal applied from the terminal 24 is passed through the opened gate 16 and sent out of the terminal 39 to carry out the interrupting operation.

The next timing pulse is applied, through the opened gate 15, to the counter 12 and increases the counting state of this counter 12 by "1." This means that the interrupting operation is carried out at once. Moreover, this timing pulse passes through the delay circuit 41 and resets the binary circuit 20. Accordingly, the input condition of the logic circuit 13 becomes "000" being case No. 1.

If an interrupting instruction is again applied from the terminal 23 at this time, the binary circuit 20 is set to the condition "1" and the counter 12 is restored to its initial condition "0." At this time, since the counter 12 generates its carry output 38, the circuit 21 is set to its condition "1." Accordingly the input condition of the logic circuit 13 becomes a condition "011" being case No. 4 of the Table 1 so that the logic circuit 13 generates its outputs 25 and 28 only. This means that an interrupting instruction cannot be accepted in this scanning period T.

The succeeding timing pulses pass through the opened gate 14 and increases the counting state of the counter 11 by "1" for each pulse. The successive counting states of the counter 11 pass through the opened gate 17 and are applied from the output terminal 39 as normal address signals.

If the counter 11 has already received four timing pulses, this counter 11 generates a carry pulse 36 which sets the binary circuit 19. At this time, since the binary circuit 20 is already reset, the input condition of the logic circuit 13 becomes a condition "101" being case No. 6 of the Table 1, where the logic circuit 13 generates its outputs 25, 28, 29, 30 and 32. Accordingly, the binary circuits 19 and 21 are reset and the input condition of the logic circuit 13 becomes a condition "000" of case No. 1. Thereafter, the above-mentioned operations can be repeatedly carried out.

b. The following relates to cases where the interrupting operation or operations is/are carried out at a time slot or slots other than the above-mentioned ones.

If the interrupting instruction is accepted between time slots ($t_{2a}$ or $t_{2b}$) and ($t_{3a}$ or $t_{3b}$) or between time slots ($t_{3a}$ or $t_{3b}$) and ($t_{4a}$ or $t_{4b}$), the operations are substantially the same as the above-case except for the difference of the counting state of the counter 11. Accordingly, details are omitted.

If the interrupting instruction is to be once accepted between the time slots ($t_{2a}$ or $t_{2b}$) and ($t_{3a}$ or $t_{3b}$) and to be further accepted between the time slots ($t_{3a}$ or $t_{3b}$) and ($t_{4a}$ or $t_{4b}$), the normal access operation is carried out after the counter 12 makes one count of the interrupting operation. Thereafter, the next interrupting operation is carried out and the counter 12 counts this further interrupting operation.

If the interrupting instruction or instructions is/are to be accepted after the normal access time slots ($t_{1a}$, $t_{2a}$, $t_{3a}$ and $t_{4a}$) or ($t_{1b}$, $t_{2b}$, $t_{3b}$ and $t_{4b}$), the operations are as follows. Since the counter 11 generates the carry pulse 36, the binary circuit 19 is set at the condition "1." At this time, if a pulse of interrupting instruction is applied from the terminal 23, the binary circuit 20 is set to the condition "1." Accordingly, the input condition of the logic circuit 13 becomes a condition "110" being case No. 7. Accordingly, the logic circuit 13 generates only its outputs 26, 27 and 29, so that the gates 14 and 17 are closed and the gate 16 is opened. The address signal for the interrupting operation applied from the terminal 24 is passed through the opened gate 16 and sent out of the terminal 39. The interrupting instructions thereafter applied can be acceptable by two times in total in a scanning period. If the counter 12 counts two timing pulses in response to two times the interrupting operation, the counter 12 generates its carry pulse 38 and sets the binary circuit 21 to the condition "1." Accordingly, the input condition of the logic circuit 13 becomes a condition "101," as in case No. 6, when the binary circuit 20 is reset by a pulse $R_2$. Since the logic circuit 13 generates its outputs 30 and 32 at this time, the binary circuits 19 and 21 are reset to their initial conditions "0." Accordingly, the input condition of the logic circuit 13 becomes the initial condition "000."

As mentioned above in detail, the interrupting system is provided with a counter 11 having a scale equal to the number of normal access time slots ($t_{1a}$, $t_{2a}$, $t_{3a}$ and $t_{4a}$) and generating address signals for the normal access to a memory, a counter 12 having a scale equal to the number of allowable interrupting time slots in a scanning period T and counting the number of the interrupting operations, two binary circuits 19 and 21 set respectively by the carry pulses of the counters 11 and 12, a binary circuit 20 set by an interrupting instruction, and a logic circuit 13 having any one of a plurality of possible output conditions in accordance with respective combinations of outputs of the three binary circuits 19, 20 and 21. By use of the outputs of the logic circuit 13, the address signals generated from the counter 11 are switched so as to be supplied to the output terminal 39. Moreover, timing pulses are applied to either the counter 11 or 12 in accordance with the output conditions of the logic circuit 13. Accordingly, the access to the memory is carried out by use of the address signals obtained at the output terminal 39. In this case, the number of allowable time slots for interrupting operations is equal to the scale of the counter 12 in a scanning period T, and the interruption can be carried out at any time slot unless the number of interrupting operations exceeds the scale of the counter 12 in a period T. Since interrupting time slots are not fixed in this system, interrupting operations can be carried out with high efficiency of time.

The switching system of this invention is described above in detail. If it is useful that the output terminals of the signal converter 2–3 are fixed to respective output channels, such as international data channels, a word or a plurality of words in each memory or register can be fixed to respective combinations of input and output channels so as to reduce the chances of a "busy" condition. In this case, either of zones 4–9 or 4–10 can be eliminated.

Moreover, if the number of handled channels is much less than the channel capacity of the processor 2–5, the character control unit 4 can be included in the processor 2–5. In this case, interruption functions timed with the duration of each character are carried out by the processor 2–5.

In this switching system, since the exchange connection signals (1–0) and the clearing signals (1–20) are transferred into the switching equipment and the call is transferred from the switching equipment to the called side, connection between a calling channel and a called channel having different signal conditions from each other can be performed without means for changing the signal condition.

The operations of the switching system of this invention are described above mainly as to signals for teletypewriter exchange service. However, other types of digital signals, such as signals for data-transmission can be switched by the system of this invention.

While we have described particular embodiments of our invention, it will of course be understood that we do not wish our invention to be limited thereto, since many modifications and changes may be made and we, therefore, contemplate by the appended claims to cover all such modifications as fall within the true spirit and scope of our invention.

What we claim is:

1. A data switching system using exchange-connection and clearing signals, and having a data processor and a plurality of data channels, for time-divisionally switching message signals of the data channels, in which system the messages to be transmitted include a plurality of characters and are preceded by said exchange-connection signals used to establish respective connected combinations between calling channels and called channels, wherein the improvement comprises: a plurality of signal converter means having input and output connectors, and having first means connected to said input connectors for time-divisionally converting serial-character message signals to parallel-character signals, having second means for time-divisionally converting parallel-character message signals to serial-character signals for coupling to the output connectors, having third means for detecting said exchange-connection signals and clearing signals time-divisionally for each channel, and having fourth means for coupling said exchange-connection signals and clearing signals time-divisionally for each channel to said output connectors; and character control means having means for transferring signals between said signal converter means and said data processor, time-divisionally for each said combination between calling and called channels, and having means for time-divisionally transferring each message character from said first means to said second means 2. A data switching system according to claim 1, in which said signal converter means comprises a clock ring counter for generating a timing signal, and scanner means connected to said ring counter for scanning input data channels in response to said timing signal, and in which said first means includes first memory means for performing said time-divisional conversion from serial-character message signals to parallel-character signals in synchronism with said timing signal; said second means includes second memory means for performing said time-divisional conversion from parallel-character message signals to serial-character signals in synchronism with said timing signal; said third means includes third memory means for performing said detection of said exchange-connection signals and clearing signals in synchronism with said timing signal, and a logic circuit for modifying the contents of the third memory means; and, said fourth means includes distributor means for distributing the output data channels in response to said timing signal.

3. A data switching system according to claim 2, in which said third memory means is further provided with control memory means for indicating time-divisionally for each channel respective signal conditions of the data channels in synchronism with said timing signal.

4. A data switching system according to claim 3, in which said control memory means is provided with indicator means for indicating time-divisionally a predetermined number of code-elements of signals used in each of said data channels, and time-divisional counter means connected to said indicator means for counting the number of code-elements of signals passed through said control memory means.

5. A data switching system according to claim 3, in which the frequency of said timing signal is equal to the least common multiple of the message modulation rates (Bauds) of all the data channels, and in which said control memory means indicates time-divisionally for each channel respective modulation rates of the data channels in synchronism with said timing signal; and further comprising counter means connected to said ring counter for counting pulses of said clock ring counter, and generator means connected to said counter, means for generating a plurality of second timing signals corresponding to respective modulation rates of said data channels, and selector means connected to said generator means for selecting time-divisionally for each channel one of said second timing signals in accordance with the contents of the control memory.

6. A data switching system according to claim 2, further comprising interrupter means for controlling said character control means to provide access to said first, second and third memory means.

7. A data switching system according to claim 6, in which said interrupter means comprises a first counter providing carry pulses and having a scale equal to the number of normal access time slots in a scanning period, a second counter providing carry pulses and having a scale equal to the number of allowable interrupting time slots in the scanning period, first and second binary circuits connected respectively to said first and second counters and set by said carry pulses of the first and second counters, a third binary circuit set by and connected to said character control means, each of said first, second and third binary circuits having output signals, logic circuit means connected to said first, second and third binary circuits for generating any one of a plurality of possible output conditions in accordance with respective combinations of said output signals of said first, second and third binary circuits a first switch means connected to said first and second counters and said logic circuit means for switching the application of timing pulses timed with the timing signal to said first or second counter in accordance with the output conditions of said logic circuit, and a second switch means connected to said first counter and said first, second and third memory means for switching address signals of interrupting operations and the output of the first counter under control of the logic circuit, whereby the output of the second switch means is employed as an address signal to provide access to said first, second and third memory means.